US011178069B2

(12) United States Patent
Sivaramalingam et al.

(10) Patent No.: US 11,178,069 B2
(45) Date of Patent: Nov. 16, 2021

(54) DATA-ANALYSIS-BASED CLASS OF SERVICE MANAGEMENT FOR DIFFERENT WEB RESOURCE SECTIONS

(71) Applicant: INTERNATIONAL BUSINESS MACHINES CORPORATION, Armonk, NY (US)

(72) Inventors: Balamurugaramanathan Sivaramalingam, Paramakudi (IN); Sathya Santhar, Ramapuram (IN); Samuel Mathew Jawaharlal, Chennai (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/825,209

(22) Filed: Mar. 20, 2020

(65) Prior Publication Data
US 2021/0297367 A1      Sep. 23, 2021

(51) Int. Cl.
*G06F 16/95* (2019.01)
*H04L 12/911* (2013.01)
(Continued)

(52) U.S. Cl.
CPC ........ *H04L 47/823* (2013.01); *G06F 16/9035* (2019.01); *G06F 16/95* (2019.01);
(Continued)

(58) Field of Classification Search
CPC ..... G06F 16/95; G06F 16/958; H04L 47/745; H04L 47/748
See application file for complete search history.

(56) References Cited

U.S. PATENT DOCUMENTS 6,763,388 B1    7/2004  Tsimelzon
7,124,188 B2   10/2006  Mangipudi et al.
(Continued)

FOREIGN PATENT DOCUMENTS

CN         110163245 A        8/2019

OTHER PUBLICATIONS

Mel et al., "The NIST Definition of Cloud Computing," National Institute of Standards and Technology, Information Technology Laboratory, Special Publication 800-145, Sep. 2011 (pp. 1-7).

*Primary Examiner* — Jeong S Park
(74) *Attorney, Agent, or Firm* — Michael A. Petrocelli, Esq.; Kevin P. Radigan, Esq.; Heslin Rothenberg Farley & Mesiti P.C.

(57) ABSTRACT

Management of class of service profiles for packet transmission is facilitated by a processor(s) obtaining one class of service (CoS) profile for one web resource section of a web resource, and another CoS profile for another web resource section of the web resource, where the one CoS profile and the other CoS profile are different CoS profiles for use in transmitting packets of the web resource over a network. The processor(s) determines which resource section a packet to be transmitted is associated with, and based on the packet being associated with the one web resource section, the processor(s) associates the one CoS profile with the packet for directing a transmission service for the packet. Based on the packet being associated with the other web resource section, the other CoS profile is associated with the packet for directing the transmission service for the packet.

20 Claims, 14 Drawing Sheets

(51) Int. Cl.
*H04L 12/927* (2013.01)
*G06F 16/9035* (2019.01)

(52) U.S. Cl.
CPC .......... *H04L 47/745* (2013.01); *H04L 47/781* (2013.01); *H04L 47/805* (2013.01); *H04L 47/821* (2013.01)

(56) References Cited

U.S. PATENT DOCUMENTS

| | | |
|---|---|---|
| 9,348,939 B2 | 5/2016 | Andrade et al. |
| 9,870,349 B2 | 1/2018 | Wei et al. |
| 2004/0044789 A1 | 3/2004 | Angel et al. |
| 2007/0283036 A1* | 12/2007 | Dey ................. H04L 43/106 709/233 |
| 2009/0276716 A1* | 11/2009 | Chua ................ G06F 16/9577 715/744 |
| 2010/0082637 A1* | 4/2010 | Mishne ............. G06F 16/9535 707/748 |
| 2015/0356179 A1* | 12/2015 | Zhukovskii .......... G06F 16/951 707/751 |
| 2017/0099341 A1* | 4/2017 | Joe ................... H04L 67/2823 |
| 2017/0206187 A1* | 7/2017 | Levi .................. G06F 40/197 |
| 2018/0198838 A1* | 7/2018 | Murgia ............. H04L 47/2433 |

* cited by examiner

DATA-ANALYSIS-BASED CLASS OF SERVICE MANAGEMENT FOR DIFFERENT WEB RESOURCE SECTIONS

BACKGROUND

Network service providers, such as telecommunication service providers, typically offer a variety of class of service (CoS) options to end users in order to manage multiple traffic profiles over the network by providing certain types of traffic priority over other types of traffic. For instance, when a network experiences congestion or delay, packets with higher class of service profile values can be prioritized in order to avoid random loss of data within the network. This prioritization is typically achieved by broadly dividing traffic based on traffic type, such as email, streaming video, voice, large document file transfers, into different class of service options, and applying different levels of priority based on various factors, such as throughput, packet loss, network delay, etc., to the different groups.

SUMMARY

Certain shortcomings of the prior art are overcome and additional advantages are provided through the provision, in one or more aspects, of a computer-implemented method of managing class of service profiles for use in packet transmission. The computer-implemented method includes obtaining, by one or more processors, one class of service profile for one web resource section of a web resource being accessed by a user across a network, and another class of service profile for another web resource section of the web resource being accessed by the user. The web resource includes multiple web resource sections, and the one class of service profile and the other class of service profile are different class of service profiles for use in transmitting packets of the web resource over the network. The computer-implemented method further including determining, by the one or more processors, for a packet to be transmitted over the network, a web resource section of the multiple web resource sections of the web resource with which the packet is associated. Based on the packet being associated with the one web resource section, the method includes associating the one class of service profile with the packet for directing a transmission service for the packet over the network, and based on the packet being associated with the other web resource section, the method includes associating the other class of service profile with a packet for directing the transmission service for the packet across the network.

Systems and computer program products relating to one or more aspects are also described and claimed herein. Further, services relating to one or more aspects are also described and may be claimed herein.

Additional features are realized through the techniques described herein. Other embodiments and aspects are described in detail herein, and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
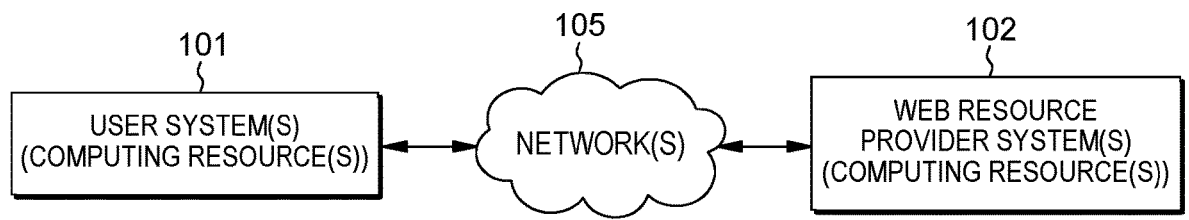
FIG. 1 depicts one embodiment of a data processing environment, which can use class of service profile management of web resource sections of a web resource, in accordance with one or more aspects of the present invention.

The accompanying figures, in which like reference numerals refer to identical or functionally similar elements throughout the separate views, and which are incorporated in and form a part of this specification, further illustrate the present invention and, together with the detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application of the concepts disclosed herein.

Note also that illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

Figure 2:
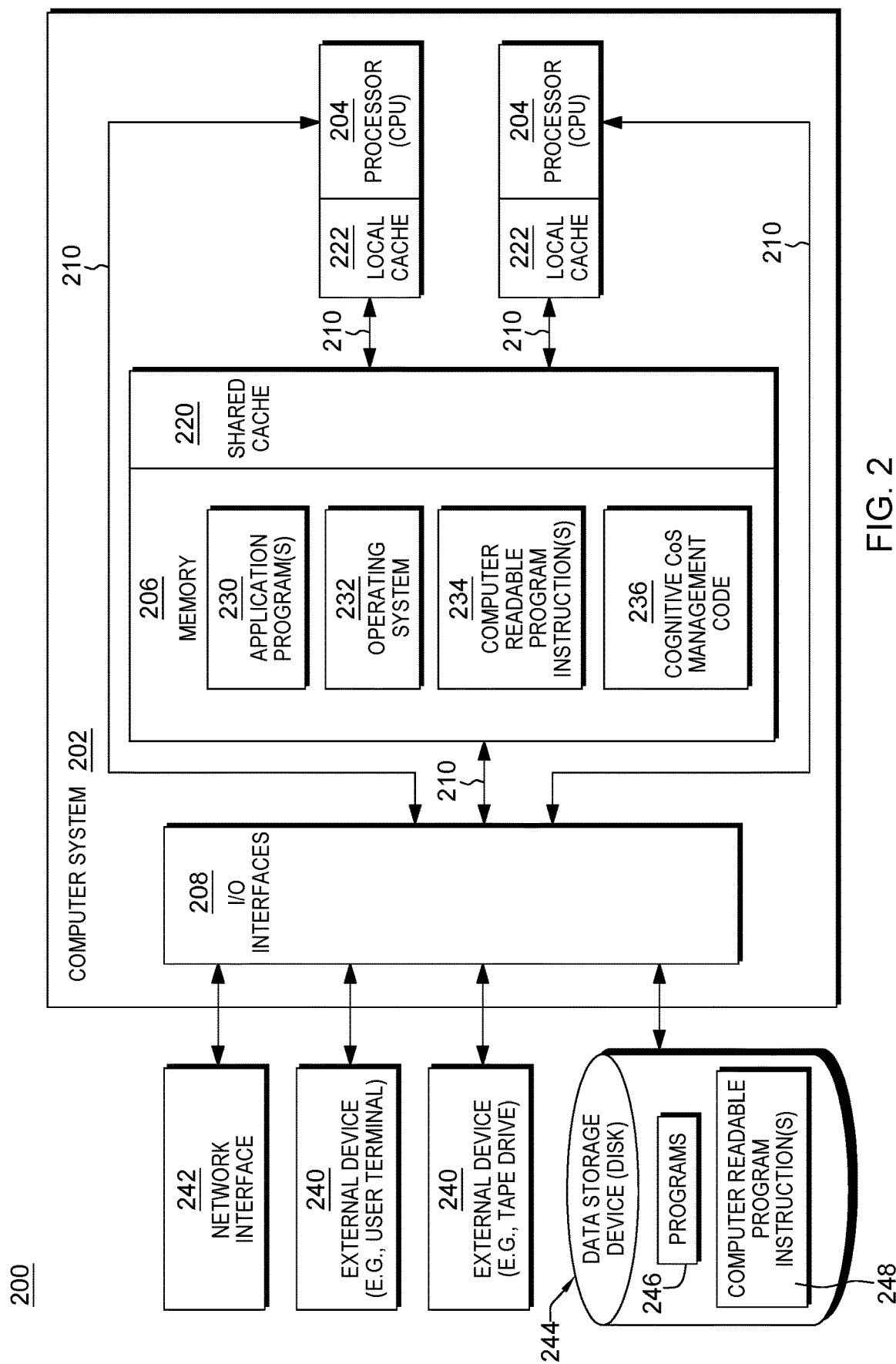
FIG. 2 depicts a block diagram of one embodiment of a data processing system which can implement processing, in accordance with one or more aspects of the present invention.

As understood by one skilled in the art, program code, as referred to in this application, can include both software and hardware. For example, program code in certain embodiments of the present invention can include fixed function hardware, while other embodiments can utilize a software-based implementation of the functionality described. Certain embodiments combine both types of program code. One example of program code, also referred to as one or more programs, is depicted in FIG. 2 as computer-readable program instructions 234, as well as application programs 230 and cognitive class of service (CoS) management code 236, one or more of which can be stored in memory 206 of computer system 202. Further examples include programs 246 and computer-readable program instruction(s) 248 in data storage device 244 of FIG. 2.

As noted initially, network service providers, such as telecommunication service providers, typically offer a variety of class of service (CoS) options to end users in order to manage high-level traffic profiles over the network. Prioritization of packets is broadly achieved by separating similar types of traffic, such as email, streaming video, voice, large document file transfers, into respective groups with various class of service options, and applying different levels of priority based on various factors, such as throughput, packet loss, network delay, etc., to each group. Further, service providers can allow users to associate different class of service profiles at different transmission levels, such as at the network device level (e.g., at customer or provider edge router), at a physical and/or virtual channel level, at a data level, and at an application level.

Where a user has subscribed to a high-priority class of service profile for a web resource, or a specific set of web resources, such as a specific set of applications or webpages, the service provider ensures that the communication channel supports the features associated with the subscribed class of service profile (e.g., zero percent packet loss, minimal delay). Note in this regard that, as used herein, web resource can refer to a single website, webpage, or application, such as a web application. Note also that the term webpage refers to a single document, typically accessible via the Internet, and that a website can be a collection of many webpages linked together. Depending on the webpage, a variety of content can be included, such as images, video, headlines, content data, navigation, credits, etc. Where a user has subscribed to a high class of service profile for a web resource, all the content available in that web resource is prioritized high, with the user consuming network bandwidth for the entire web resource based on the assigned high priority profile, potentially adding to network congestion.

Further, there can be issues where a user system is attempting to access a web resource (e.g., a website) during peak traffic. In order to avoid timeout issues having to do with network congestion, a user might open multiple windows and perform parallel transactions so that if one of the windows times out, then the user can use another window to restart the transaction. This opening of multiple windows and performing parallel transactions can further add to network congestion.

Advantageously, addressing these issues, disclosed herein are computer-implemented methods, systems, and computer program products, which allow different class of service profiles to be assigned to different sections or segments of a web resource, such as a webpage or application. Thus, a higher cost of service profile is able to be applied to a specific portion of a web resource, without applying the higher cost of service profile to the entire web resource content. For example, where a high cost of service profile is assigned to a website in which a user wishes to watch an embedded video content in a webpage, such as live coverage of an ongoing event, there may be other videos embedded in the webpage, such as coverage of prior events, which are of less interest to the user currently, as well as, for instance, advertisements or other images published by the website or webpage which are of little interest to the user. By sectionalizing or segmenting the web resource, such as by content or location within the web resource, it is possible for different web resource sections to have associated therewith different class of service profiles, as described herein.

More particularly, embodiments of the present invention include a computer-implemented method, system, and computer program product for facilitating managing class of service profiles for use in packet transmission, where program code executing on one or more processors obtains one class of service (CoS) profile (i.e., a first CoS profile) for one web resource section of a web resource being accessed by a user across the network, and another class of service profile (i.e., a second CoS profile) for another web resource section of the web resource. The web resource includes multiple web resource sections, and the one class of service profile and the other class of service profile are different class of service profiles for use in transmitting packets of the web resource over the network. Embodiments of the present invention also include program code that determines, for a packet to be transmitted over the network, a web resource section of the multiple web resource sections of the web resource with which the packet is associated. Embodiments of the present invention further include program code, that based on the packet being associated with the one web resource section, associates the one class of service profile with the packet for directing a transmission service for the packet over the network, and based on the packet being associated with the other web resource section, associates the other class of service profile with the packet for directing the transmission service for the packet across the network.

In one or more embodiments of the present invention, program code executing on one or more processors determines the one class of service profile for the one web resource section based on data analysis of one or more prior web resource accesses by the user (and/or other users), and determines the other class of service profile for the other web resource section based on the data analysis of the one or more prior user web resource accesses. In certain embodiments of the present invention, program code executing on one or more processors further determines the one class of service profile for the one web resource section based on one or more current performance attributes of the network, and further determines the other class of service profile for the other web resource section based on the one or more current performance attributes of the network.

In one or more embodiments, program code executing on one or more processors segments the web resource into the multiple resource sections based on data analysis of the one or more prior user web resource accesses. Further, in one or more embodiments, program code executing on one or more processors provides an indication to the user of the multiple web resource sections of the web resource, and the determined one class of service profile for the one web resource section, and the other class of service profile for the other web resource section. In certain embodiments of the present invention, program code executing on one or more processors receives input data from the user indicative of a user selection. The user selection can include one or more of: the user accepting the multiple web resource sections of the web resource; the user accepting the determined one class of service profile; the user accepting the other class of service profile; the user redefining the multiple web resource sections; the user redefining the determined one class of service profile; or the user redefining the other class of service profile.

In one or more embodiments of the present invention, program code executing on one or more processors receives input data from the user identifying the one class of service profile for the one web resource section, and receives input data from the user identifying the other class of service profile for the other web resource section. Further, in one or more embodiments, program code executing on one or more processors further receives input data from the user indicative of the multiple web resource sections of the web resource.

In one or more embodiments, program code executing on one or more processors provides different class of service profile recommendations to the user for two or more web resource sections of the multiple web resource sections of the web resource, and the input data received is responsive to the providing of the respective class of service profile recommendations.

In one or more embodiments, the web resource is a webpage, and the one web resource section and the other web resource sections are different sections of the webpage.

Embodiments of the present invention are inextricably tied to computing and provide significantly more than existing approaches to managing class of service profiles for use in packet transmission. For instance, embodiments of the present invention provide program code executing on one or more processors to exploit the interconnectivity of various systems, as well as to utilize various computing-centric data analysis and handling techniques, in order to obtain one class of service profile for one web resource section of a web resource being accessed by a user across a network, and another class of service profile for another web resource section of the web resource, where the one class of service profile and the other class of service profile are different class of service profiles for use in transmitting packets of the web resource over the network, and for determining which web resource section a packet to be transmitted over the network is associated, and based on the packet being associated with the one web resource section, associating the one class of service profile with the packet, and based on the packet being associated with the other web resource section, associating the other class of service profile with the packet. Both the interconnectivity of the devices and/or computing systems utilized, and the computer-exclusive data processing techniques utilized by the program code, enable various aspects of the present invention. Further, embodiments of the present invention provide significantly more functionality than existing approaches to managing class of service by advantageously providing the capability to assign different class of service profiles to different identified sections of a web resource, such as to different sections of a webpage or application, for use in directing packet transmission for the web resource across the network.

In embodiments of the present invention, program code provides significantly more functionality, including but not limited to: 1) program code that obtains one class of service profile for one web resource section of a web resource being accessed by a user across a network, and another class of service profile for another web resource section of the web resource, where the one class of service profile and the other class of service profile are different class of service profiles for use in transmitting packets of the web resource over the network; 2) program code that determines, for a packet to be transmitted over the network, a web resource section of the multiple web resource sections of the web resource with which the packet is associated; 3) program code that, based on the packet being associated with the one web resource section, associates the one class of service profile with the packet for directing a transmission service of the packet over the network; and 4) program code that, based on the packet being associated with the other web resource section, associates the other class of service profile with a packet for directing the transmission service for the packet across the network.

By way of example, FIG. 1 depicts one embodiment of a data processing environment 100, which can incorporate class of service profile management of web resources, in accordance with one or more aspects of the present invention. In the embodiment depicted, data processing environment 100 includes one or more user systems 101, as well as one or more web resource provider systems 102, each of which include, or run on, one or more respective computer resources. In one embodiment, web resource provider system(s) 102 can provide one or more web resources, such as one or more applications, webpages, etc., for access by user system(s) 101. User system(s) 101 communicates with web resource provider system(s) 102 to access a web resource across one or more networks 105. By way of example, network(s) 105 can be, for instance, a telecommunications network, a local-area network (LAN), a wide-area network (WAN), such as the Internet, or a combination thereof, and can include wired, wireless, fiber-optic connections, etc. The network(s) can include one or more wired and/or wireless networks that are capable of receiving and transmitting data, including data packets, with associated class of service profiles, such as described herein.

FIG. 2 depicts another embodiment of a data processing environment, or a computer resource, in which one or more aspects of illustrative embodiments can be implemented. FIG. 2 is only an example and is not intended to assert or imply any limitation with regard to the environments in which different aspects of embodiments can be implemented. A particular implementation may make many modifications to the depicted environment based on the following description.

With reference to FIG. 2, a block diagram of a data processing system is shown in which one or more aspects of the present invention can be implemented. Data processing system 200 is an example of a computer, such as server, or other type of device, in which computer usable program code or instructions implementing one or more processes may be located for the illustrative embodiments.

As shown in FIG. 2, data processing system 200 includes, for instance, a computer system 202 shown, e.g., in the form of a general-purpose computing device. Computer system 202 can include, but is not limited to, one or more processors or processing units 204 (e.g., central processing units (CPUs)), a memory 206 (referred to as main memory or storage, as examples), and one or more input/output (I/O) interfaces 208, coupled to one another via one or more buses and/or other connections 210.

Processor 204 includes a plurality of functional components used to execute instructions. These functional components include, for instance, an instruction fetch component to fetch instructions to be executed; an instruction decode unit to decode the fetched instructions and to obtain operands of the decoded instructions; instruction execution components to execute the decoded instructions; a memory access component to access memory for instruction execution, if necessary; and a write back component to provide the results of the executed instructions.

Bus 210 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 206 can include, for instance, a cache 220, such as a shared cache, which may be coupled to local caches 222 of processors 204. Further, memory 206 can include one or more programs or applications 230, an operating system 232, and one or more computer readable program instructions 234, as well as cognitive class of service (CoS) management code 236, implementing one or more aspects disclosed herein. Additionally, or alternatively, computer readable program instructions 234 can be configured to carry out one or more other functions of certain embodiments of the invention.

Computer system 202 can also communicate via, e.g., I/O interfaces 208 with one or more external devices 240, one or more network interfaces 242, and/or one or more data storage devices 244. Example external devices include a user terminal, a tape drive, a pointing device, a display, etc. Network interface 242 enables computer system 202 to communicate with one or more networks, such as a local area network (LAN), a general wide area network (WAN), and/or a public network (e.g., the Internet), providing communication with other computing devices or systems.

Data storage device 244 can store one or more programs 246, one or more computer readable program instructions 248, and/or data, etc. The computer readable program instructions can be configured to carry out functions of one or more aspects of the present invention.

Computer system 202 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 202. Examples, include, but are not limited to: microcode, device drivers, redundant processing units, external disk drive arrays, RAID systems, tape drives, and data archival storage systems, etc.

Computer system 202 can be operational with numerous other general purpose or special purpose computing system environments or configurations. Examples of well-known computing systems, environments, and/or configurations suitable for use with computer system 202 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and cloud computing environments that include any of the above systems or devices, and the like.

Note again that the depicted example of FIG. 2 is not meant to imply architectural limitations. Further, as noted, data processing system 200 of FIG. 2 could be, for instance, a server, workstation, tablet computer, laptop computer, or other computing device.

As discussed, network service providers allow users to associate different class of service (CoS) profiles at different levels, such as at the network device level (e.g., at customer-provider edge router), at a physical and/or virtual channel level, and at an application or webpage level. The existing CoS approaches typically focus on setting the CoS profile based on attributes of the network or communication channel, or associating the CoS profile to an entire webpage or application. Advantageously, disclosed herein in one or more aspects, are a method, system, and computer program product which enable different class of service (CoS) profiles to be provided for different sections or segments of a web resource, such as different sections of a webpage or application. For instance, in one or more embodiments, various class of service (CoS) profiles are dynamically defined or set for different sections of a web resource based on the significance or importance of the content in real-time to a particular user, which can be user-set, or determined (in one or more implementations) by machine learning.

By way of example, in accordance with one or more aspects disclosed herein, a user can select one or more sections of the web resource, and can associate different cost of service profiles with different sections of the web resource. For instance, in one embodiment, a user might select a section of a web resource which represents a bank payment section, and can associate a cost of service profile with that section, so that the web resource session does not get terminated in between until the transaction is completed. The cost of service profile is used in packet transmission at the network level, as described herein. In accordance with Applicant's invention, different types of payloads can be differentiated with different priorities or class of services. For instance, if there is a webpage with multiple web sections, such as ticket booking, chat, complaints, training video, etc., a user can associate a high class of service profile for the booking section, and a different class of service profile to the chat section, and so on. The high class of service profile might be defined as packet loss <%1, no session termination in between, full bandwidth allocation, jitter <%2, etc., all of which are controlled by the network elements between the web resource provider and the user system. These properties of the high class of service profile can be assigned to the ticket booking session, and to further pages it opens when the user clicks that section, whereas other properties would be applied to other web resource sections based on the class of service profiles selected for those sections, or assigned by default. In one implementation, each data packet that is sent from the ticket booking section would carry a high class of service profile, as assigned by the user or the management system. The network elements (e.g., routers, switches) would read each data packet and the associated class of service profile, and apply the corresponding properties for that particular data packet.

As another example, in a corporate environment, a user might assign a business critical class of service profile to one section of a web resource, and a less critical class of service profile to another section of the web resource.

By way of further example, disclosed herein is a cognitive class of service management system which allows a user, or the system, to dynamically change class of service profiles for any section of a web resource, for instance, using machine learning (ML) based on prior user web resource accesses of that web resource, or similar web resources. In one or more embodiments, the class of service management system can apply the best, or optimized, class of service profile for each section of a web resource, for each user, that is, where the user does not select class of service profiles or define different sections of the web resource. In this manner, different properties can be assigned to the data packets so that the network can handle each section of the web resource differently. If desired, a user can also select an irregular area of a web resource, and can apply a class of service profile for that section, instead of the web resource being specifically defined as a fixed set of sections for the user to select.

Figure 3:
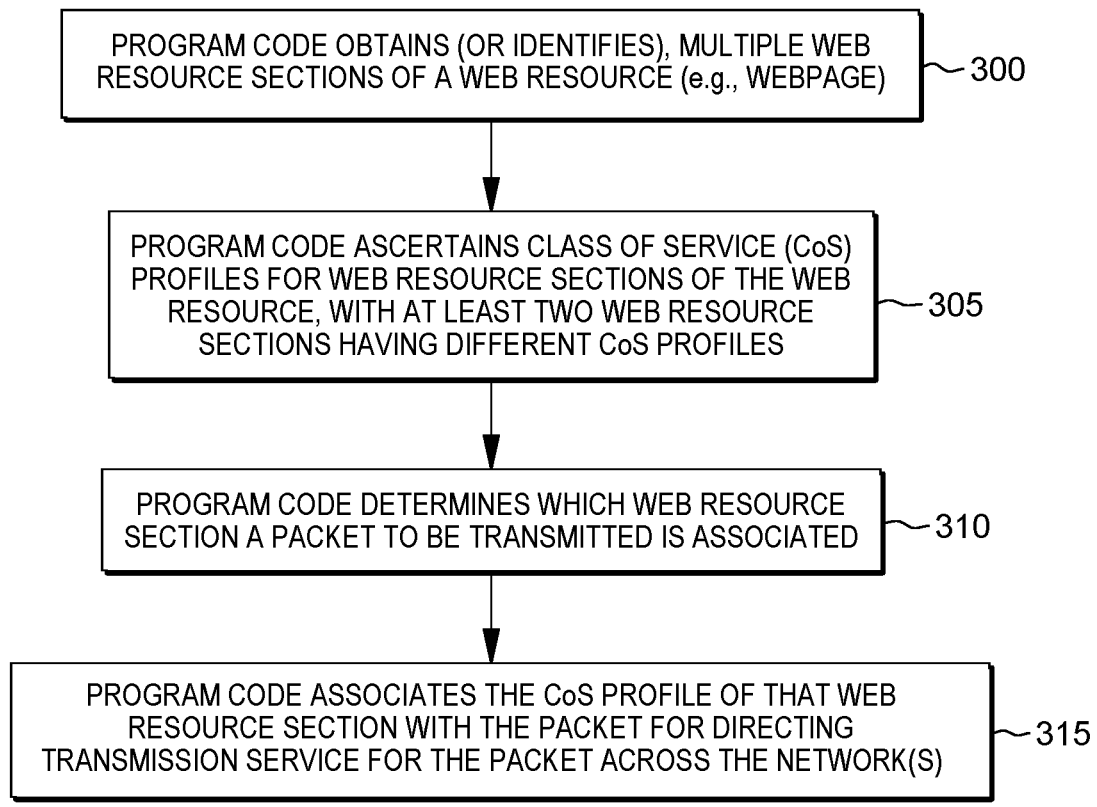
FIG. 3 depicts one embodiment of a workflow that illustrates certain aspects of some embodiments of the present invention.

FIG. 3 depicts one high-level embodiment of a workflow or process illustrating one or more aspect of some embodiments of the present invention. As illustrated, in one or more embodiments, program code executing on one or more processors obtains (e.g., receives or identifies) multiple different web resource sections or segments of a web resource 300. For instance, the web resource can be a webpage or a web application, and the program code can obtain data indicative of the multiple webpage sections or application sections from a user or the web server providing the resource. Program code executing on one or more processors ascertains class of service (CoS) profiles for the web resource sections of the web resource, with at least two web resource sections having different CoS profiles 305. Program code also determines which web resource section a packet to be transmitted is associated 310, and program code executing on one or more processors associates the CoS profile of that web resource section with the packet for directing the transmission service for the packet across a network 315.

The above-noted process can be used in a variety of applications, including applications such as described herein. For instance, in one or more implementations, a cognitive CoS management system is provided which can leverage existing webpage sectionalizing methodologies to enable a user to select a specific portion of a webpage, which could logically act as a short webpage, and allow the user to assign a desired CoS profile to that specific portion of the webpage. In one or more embodiments, creating a short webpage can be based on an original page by dividing the current version of the webpage into a plurality of blocks, and allowing user-selection information to be added to each of the plurality of blocks. For instance, the user-selection information can include a class of service profile selected from a plurality of class of service profile options, which can incorporate guidance for a plurality of packet transmission factors, such as acceptable data loss in packet transmission across the network, acceptable delay in packet transmission across the network, etc. In this manner, user selections or preferences can be stored by the cognitive CoS management system, and used by the system in the future to predictively sectionalize or segmentize one or more other web resources into respective web resource sections, and to provide a recommended CoS profile for each section for that user.

Thus, in one or more implementations, the user defines multiple segments or sections of a webpage or application, and assigns a CoS profile for each user-defined section of the web resource. In one or more other embodiments, the cognitive CoS management system includes a content analyzer module, an optimal CoS identifier module, a dynamic CoS profiler module, and a user system preference tracking module which together learn based on prior user web resource accesses, and automatically detect or identify different sections or segments in a web resource (e.g., based on content) to perform CoS analysis for each section of a web resource. In one or more further embodiments, the CoS management system enables a user to accept the web resource recommended sectioning and the CoS profile recommendations provided by the management system, or to choose to define or redefine the web resource sections and/or CoS profiles differently.

Figure 4A:
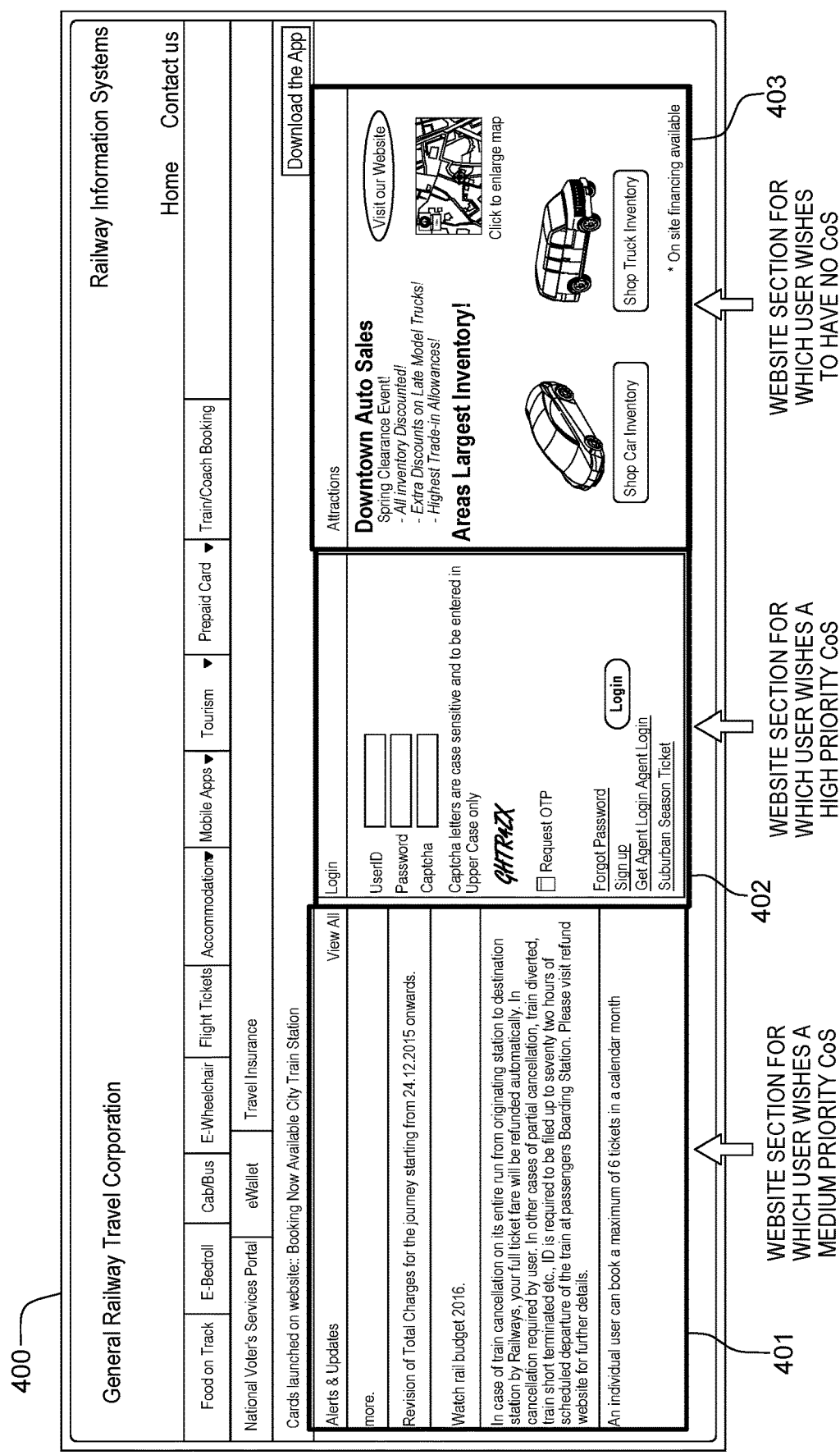
FIG. 4A illustrates one embodiment of a user system display depicting a web resource with multiple web resource sections identified, in accordance with one or more aspects of the present invention.

By way of example, FIG. 4A depicts one embodiment of a user system display 400 illustrating a web resource, which is divided into multiple webpage sections 401, 402, 403, based on content. By way of example, the web resource can be a webpage, a website, or a web application. As known, a website is a collection of related network web resources, such as webpages, multimedia content, which are typically identified as common domain name, and published on at least one web server. In one or more embodiments, a web application is a website that, for instance, includes business logic. A web application is intended for user interactions, performing actual business functions, whereas a website might be a blog or news site, or other collection of webpages. A webpage is a single document which can be displayed in a web browser, and is typically provided by a web server, which is (for instance) a computer that hosts a website on the Internet. A page request is an opportunity for an HTML document to appear on a browser window as a direct result of a user interaction with a website. A page load begins when a user selects a hyperlink, submits a form, or types a URL in a browser. This is referred to as the initial request or when the navigation starts. The user's action sends the request across the network to the web application server, and the server provides the requested web resource in response.

As noted, the sectionalizing or segmenting of the webpage into multiple sections can be performed by the user, the web server, or by the management system through machine learning over time based on prior user selections. In the example of FIG. 4A, web resource section 401 contains alerts and updates for which the user has selected a medium priority CoS profile, a login web resource section 402 for which the user has selected a high-priority CoS profile, and an attractions section 403 for which the user wishes to have no class of service profile selected, or to have a lowest class of service profile selected, such as by default. By way of example, a user could select a closed boundary in a section or segment of a webpage using a mouse pointer, which then becomes a web resource section or sub-webpage. This closed boundary can be a regular figure, such as a square, rectangle, circle, or it could be an irregular figure. This option could be provided by the user-browser, or by the webpage server itself, and can allow the user to click, for instance, a "selected region" button, and once selected, the user can draw one or more closed boundaries onto the webpage depicted. The cognitive CoS management system can learn about these different selections by the user, and/or other users, and can add the selections to the management system's corpus of data for learning and prediction purposes, so that the management system itself can make recommendations to the user or other users as to sectioning of a particular web resource and/or for associating different CoS profile recommendations to the different web resource sections, as described herein. By way of further example, the web resource server can provide subject-matter-based sectioning of a webpage or application, if desired.

Figure 4B:
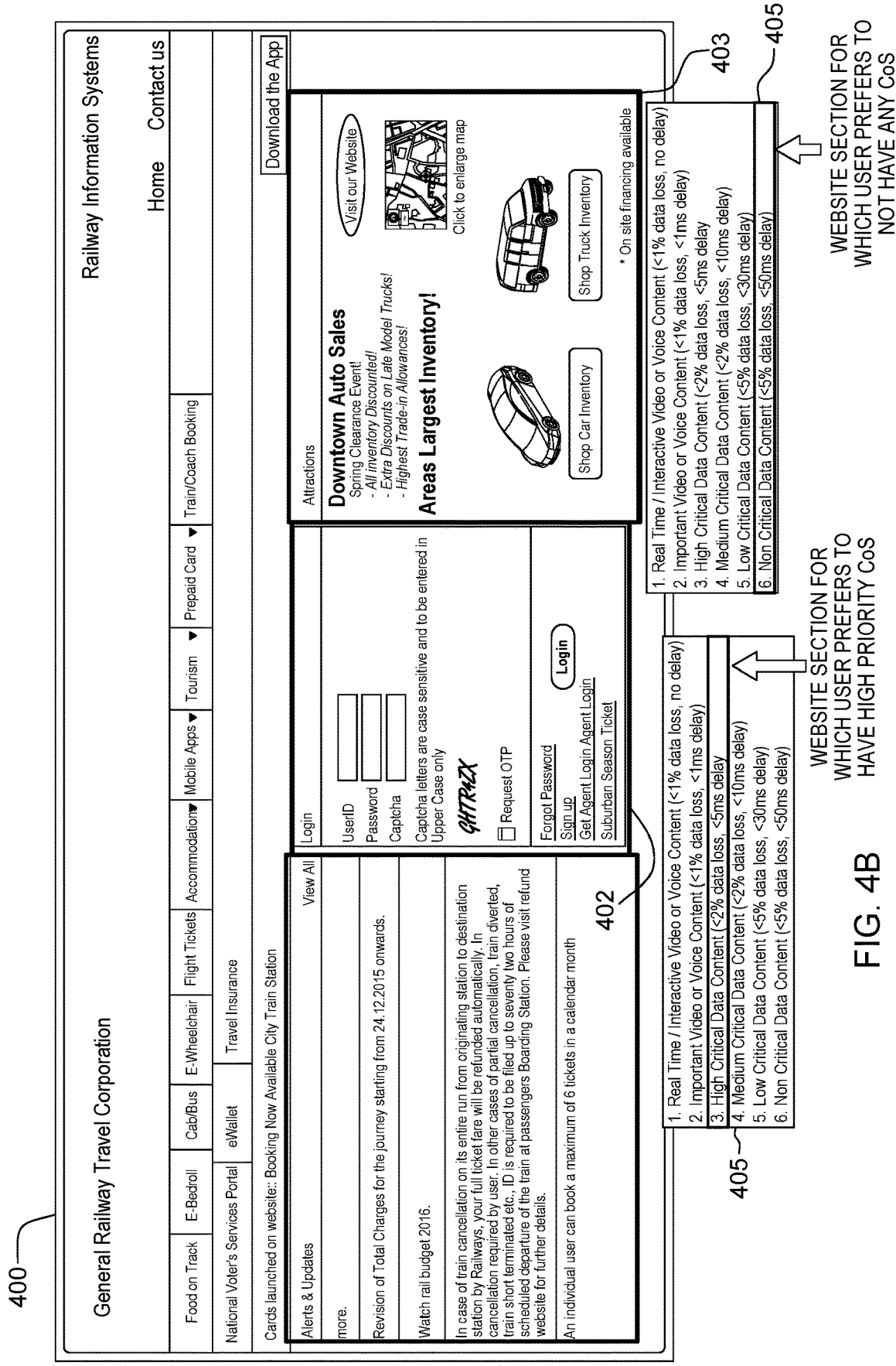
FIG. 4B depicts one embodiment of class of service profiles available for user selection, shown associated with different web resource sections of the web resource, in accordance with one or more aspects of the present invention.

FIG. 4B depicts the web resource example of FIG. 4A, with a class of service profile option menu 405 shown associated with web resource section 402, where a high-critical data content profile for the content of web resource section 402 is identified, and a class of service profile option menu 405 associated with web resource section 403, where a non-critical data content profile is selected since the user has less interest or preference for the content in that web resource section.

Note in regard to FIG. 4B that the particular class of service profile options menu 405 depicted is one example only of an options menu, and that the type of class of service profiles which can be employed can vary across data transmission systems.

Figure 4C:
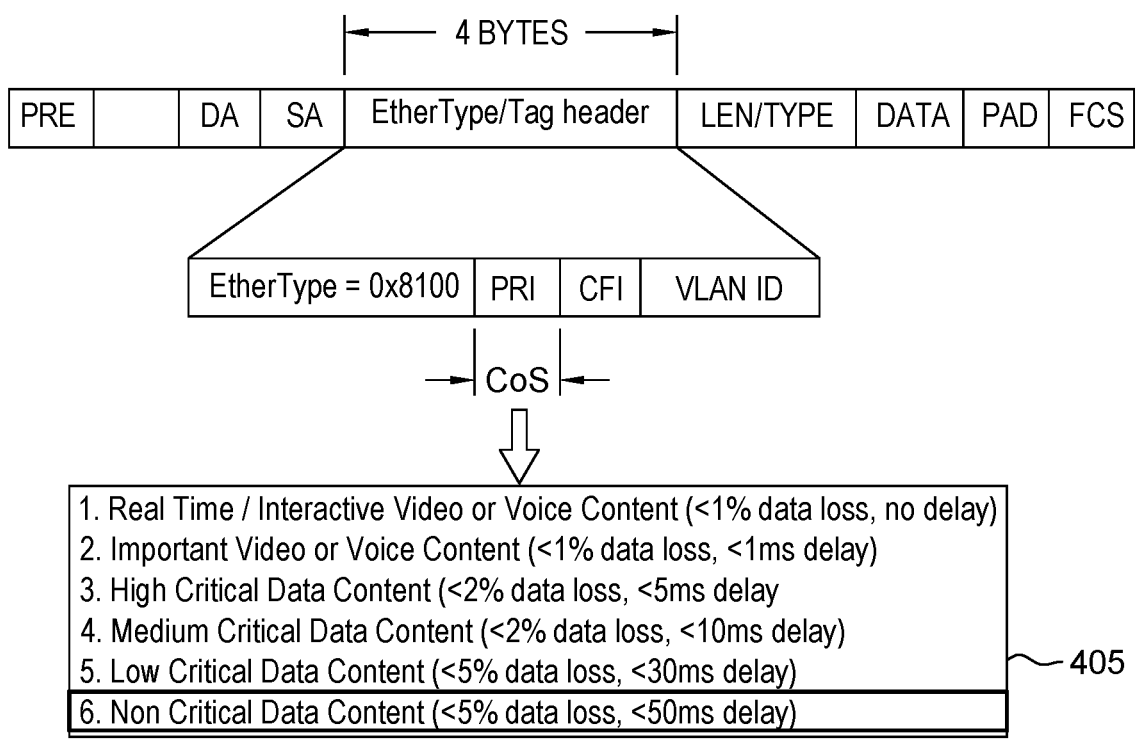
FIG. 4C depicts one embodiment of an Ethernet data packet with a bit segment for setting a class of service profile for the data packet for use in accordance with one or more aspects of the present invention.

In one or more embodiments, web resources are sent across a network as a collection of data packets. By way of example, Ethernet is a standard communication protocol embedded in software and hardware devices, which can be used for building a local-area network, with the network's router also serving as a bridge to the Internet. In one or more embodiments, Ethernet is a physical layer in the data link layer between devices. An Ethernet frame is a data link layer protocol data unit that uses the underlying Ethernet physical layer transport mechanisms. FIG. 4C depicts one embodiment of an Ethernet data packet, which can be used in accordance with one or more aspects disclosed herein.

In the example of FIG. 4C, the PRE field is the preamble, which is a 7-byte preamble that the Ethernet frame starts with. The PRE field indicates to the receiver that a frame is coming, and allows the receiver to lock onto the data stream before the actual frame begins. The DA field is a destination address, which can be a 6-byte field which contains the MAC address of the machine for which the data is destined, and the SA field is a source address. This is a 6-byte field which contains the MAC address of the source machine. A source address is always an individual address, and the least significant bit of the first byte is always zero. The LEN/TYPE field is the length, which is a 2-byte field that contains the length of the entire Ethernet frame. The 16-bit field can hold the length of a value between zero to 65534, but length cannot be larger than 1500 because of certain constraints of Ethernet. The DATA field is where actual data is provided, and also known as the PAYLOAD. Both the IP header and data are inserted in the DATA field if Internet protocol is used over Ethernet. The maximum data present can be as long as 1500 bytes. The PAD field is used if the data is less than the minimum required, with padding being added. If the data is more than the maximum limit, then the extra data is packed in the next packet. The FCS field is the frame check sequence, which can be a 4-octet cyclic redundancy check (CRC) that allows detection of corrupted data within the entire frame as received on the receiver side.

The ETHERYPE/TAG header is a 4-byte field, which can be used to indicate the type of payload being carried by the frame. The EtherType=0x8100 is the VLAN EtherType value, with the VLAN ID being, for instance, a 12-bit field specifying the VLAN to which the frame belongs. The CFI field is used to ensure compatibility between Ethernet and token ring networks, and the CFI field has a fixed value of zero on Ethernet networks. As illustrated in FIG. 4C, the PRI field is a priority field which, in one or more embodiments, includes an indication of the associated CoS profile for the data packet. In the example of FIG. 4C, the CoS profile options 405 of FIGS. 4A & 4B are repeated, by way of example. Note that the particular options in a given implementation can vary. In operation, the data packet is associated with a particular web resource section of a web resource, and the assigned class of service profile for that section of the web resource can be associated with the data packet itself to guide the network in transmitting the packet over the network.

Figure 5A:
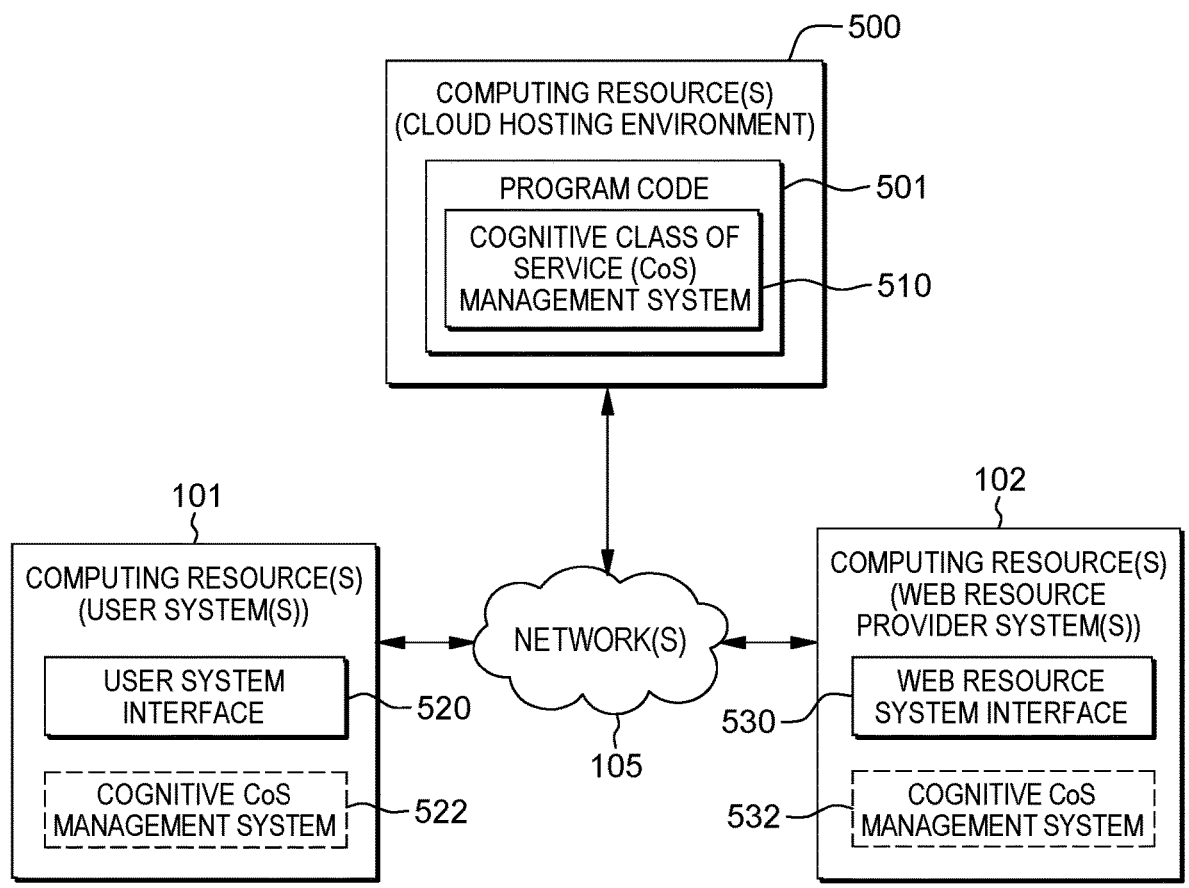
FIG. 5A depicts one embodiment of a system, illustrating certain aspects of an embodiment of the present invention.

FIG. 5A depicts a further embodiment of a technical environment or system into which various aspects of some embodiments of the present invention can be implemented. By way of example, various computing devices can be provided or used, including one or more user system 101 computing resources, one or more web resource provider system 102 computing resources, and one or more computing resources 500, such as a cloud hosting environment. In the embodiment illustrated, computing resource(s) 500 executes program code 501 implementing a cognitive class of service (CoS) management system 510 such as disclosed herein, one embodiment of which is described in further detail with reference to FIG. 5B. In the embodiment depicted, computing resource(s) 500 can be one or more computing resources of a cloud hosting environment, by way of example only.

Further, as illustrated in FIG. 5A, one or more aspects of cognitive CoS management system 510 could alternatively be implemented, in whole or in part, as a cognitive CoS management system 522 associated with user system 101 computing resources, or as cognitive CoS management system 532 associated with web resource provider system 102 computing resource(s). Further, as illustrated, user system(s) 101 includes a user system interface 520 to operatively couple to network 105, and web resource provider system(s) 102 includes a web resource system interface 530 to operatively couple to network 105. As noted, network 105 can be, for instance, a telecommunications network, a local-area network (LAN), a wide-area network (WAN), such as the Internet, or a combination thereof, and can include wired, wireless, fiber-optic connections, etc. The network(s) 105 can include one or more wired and/or wireless networks that are capable of receiving and transmitting data, including data packets associated with web resources, such as described herein.

Figure 5B:
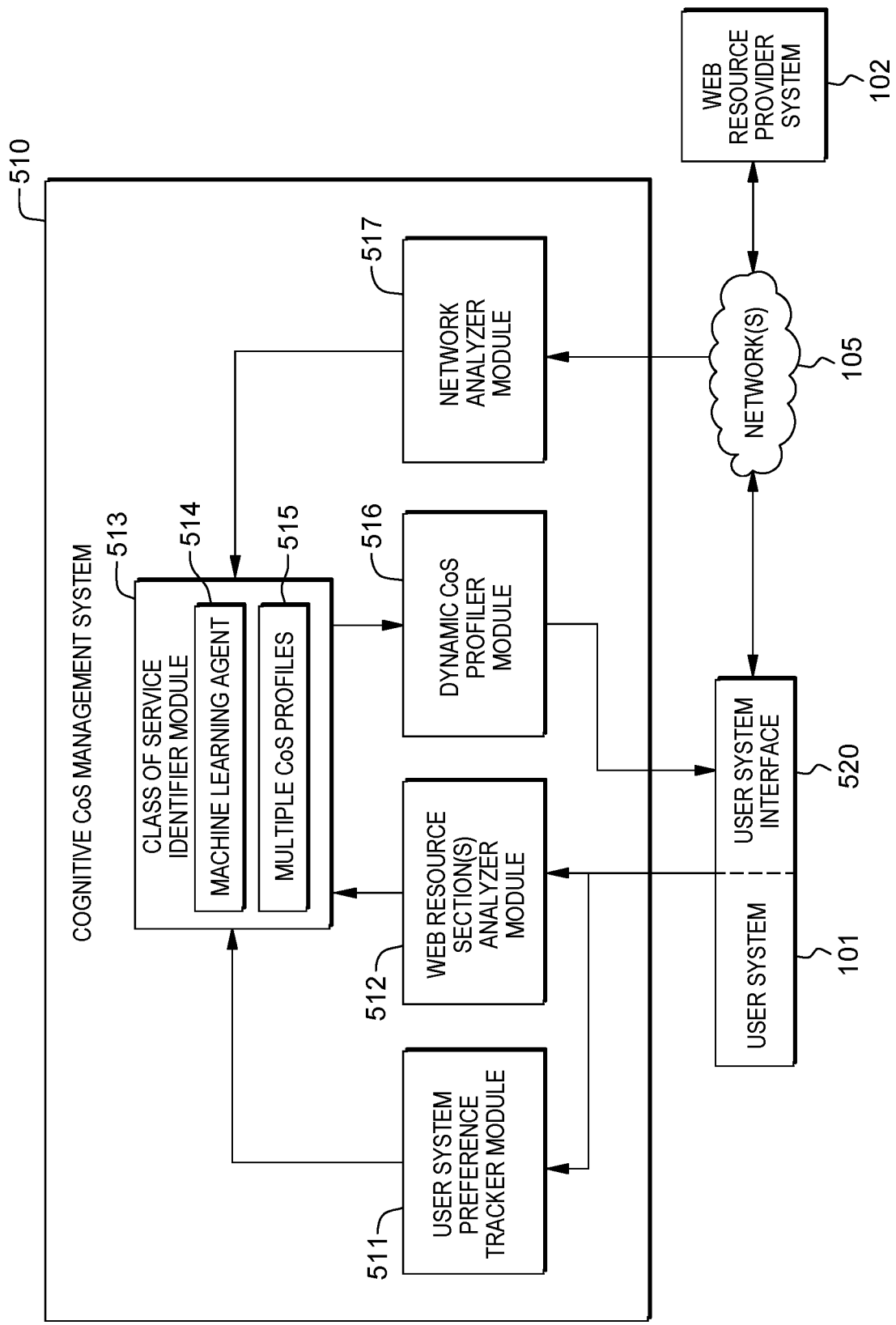
FIG. 5B depicts one embodiment of a cognitive class of service management system, illustrating certain aspects of one or more embodiments of the present invention.

FIG. 5B depicts one embodiment of a cognitive CoS management system 510, in accordance with one or more aspects disclosed herein. As illustrated in FIG. 5B, cognitive CoS management system 510 can include, in one or more embodiments, a user system preference tracker module 511, a web resource section(s) analyzer module 512, a class of service (CoS) identifier module 513, and a dynamic CoS profiler module 516. Additionally, a network analyzer module 517 can be provided to ascertain current network performance data for use as described herein. In the depicted embodiment, class of service identifier module 513 can include, or use, a machine learning agent 514, and a database storing, for instance, data on prior user web resource accesses, as well as multiple CoS profile options 515. Machine learning agent 514 can use one or more models to predictively recommend, for instance, sectioning of a particular web resource into multiple web resource sections, and to predictively recommend a class of service profile for each web resource section based, for instance, on prior user web resource accesses, and optionally, based on one or more current performance attributes of the network.

The modules depicted in FIG. 5B are shown associated with cognitive CoS management system 510, by way of example only. One or more of the modules could be associated with, for instance, user system 101, web resource provider system 102, or network 105, depending on the module, and the desired implementation. Note also that cognitive CoS management system 510 is shown in FIGS. 5A & 5B separate from user system 101 and separate from web resource provider system 102, as one example only. This is a non-limiting example of an implementation. In the embodiment illustrated, cognitive CoS management system 510 executes on computing resource(s) 500 (FIG. 5A) as program code, and together the program code and any probabilistic models generated by machine learning agent 514 are configured to perform methods in accordance with one or more aspects of the present invention. By way of example, cognitive CoS management system is housed or executes on a server or other computing-system-implemented resource that is, in one or more embodiments, separate from user system 101 and separate web resource provider system 102, or in one or more other implementations, integrated within user system 101 and/or within web resource provider system 102, as desired for a particular application.

Briefly described, the computing resources executing the cognitive CoS management system can include one or more processors, for instance, central processing units (CPUs). Also, the processor(s) can include functional components used in the integration of program code, such as functional components to fetch program code from locations such as cache or main memory, decode program code, and execute program code, access memory for instruction execution, and write results of the executed instruction or code. The processor(s) can also include a register(s) to be used by one or more of the functional components. In one or more embodiments, the computing resource(s) can include memory, input/output, a network interface, and storage, which can include and/or access, for instance, data from multiple data sources, including data representative of prior user web resource accesses, and data representative of current performance attributes of the network. The components of the computing environment can be coupled to each other via one or more buses and/or other connections. Bus connections can be one or more of any of several types of bus structures, including a memory bus or a memory controller, a peripheral bus, an accelerated graphics port, and a processor or local bus, using any of a variety of bus architectures.

By way of example, and not limitation, such architectures can include the industry standard architecture (ISA), the micro-channel architecture (MCA), the enhanced ISA (EISA), the video electronic standard association (VESA), local bus, and peripheral component interconnect (PCI). Examples of the computing resource(s) or computer system(s) which can implement one or more aspects disclosed herein are described in greater detail with reference to FIGS. 2 & 8-9. Note also that, depending on the implementation, one or more aspects of the computing resource(s) executing cognitive CoS management system 510 can be associated with, licensed by, subscribed to by, etc., a company or organization operating, owning, etc., one or more of the user system(s) 101, web resource provider system(s) 102, and/or network(s) 105.

In the illustrative embodiment of FIG. 5B, user system preference tracker module 511 and web resource section(s) analyzer module 512 provide data to class of service identifier module 513, such as data on one or more prior user web resource accesses. Note that the prior web resource access(es) could be by the same user system and same end user, or by different user systems and/or different end users, depending on the implementation. In one or more embodiments, user system preference tracker module 511 provides data indicative of prior user selections or acceptances of CoS profiles for different web resource sections of the prior web resource accesses, and web resource section(s) analyzer module 512 determines for the prior access(es), as well as the current access, the particular web resource sections or segments of the web resource. For instance, in one or more embodiments, where the web resource is a webpage, web resource section(s) analyzer module 512 analyzes content of the webpage to determine or identify the webpage sections, as well as to, for instance, identify a particular webpage section that a user is current applying a CoS profile to, or to which a CoS profile was previously applied.

In one or more embodiments, network analyzer module 517 obtains data, in one or more embodiments, on one or more current performance attributes of the network. For instance, in one or more implementations, the cognitive CoS management system can subscribe to the network provider to provide the requested data on hardware performance of the network.

Figure 6:
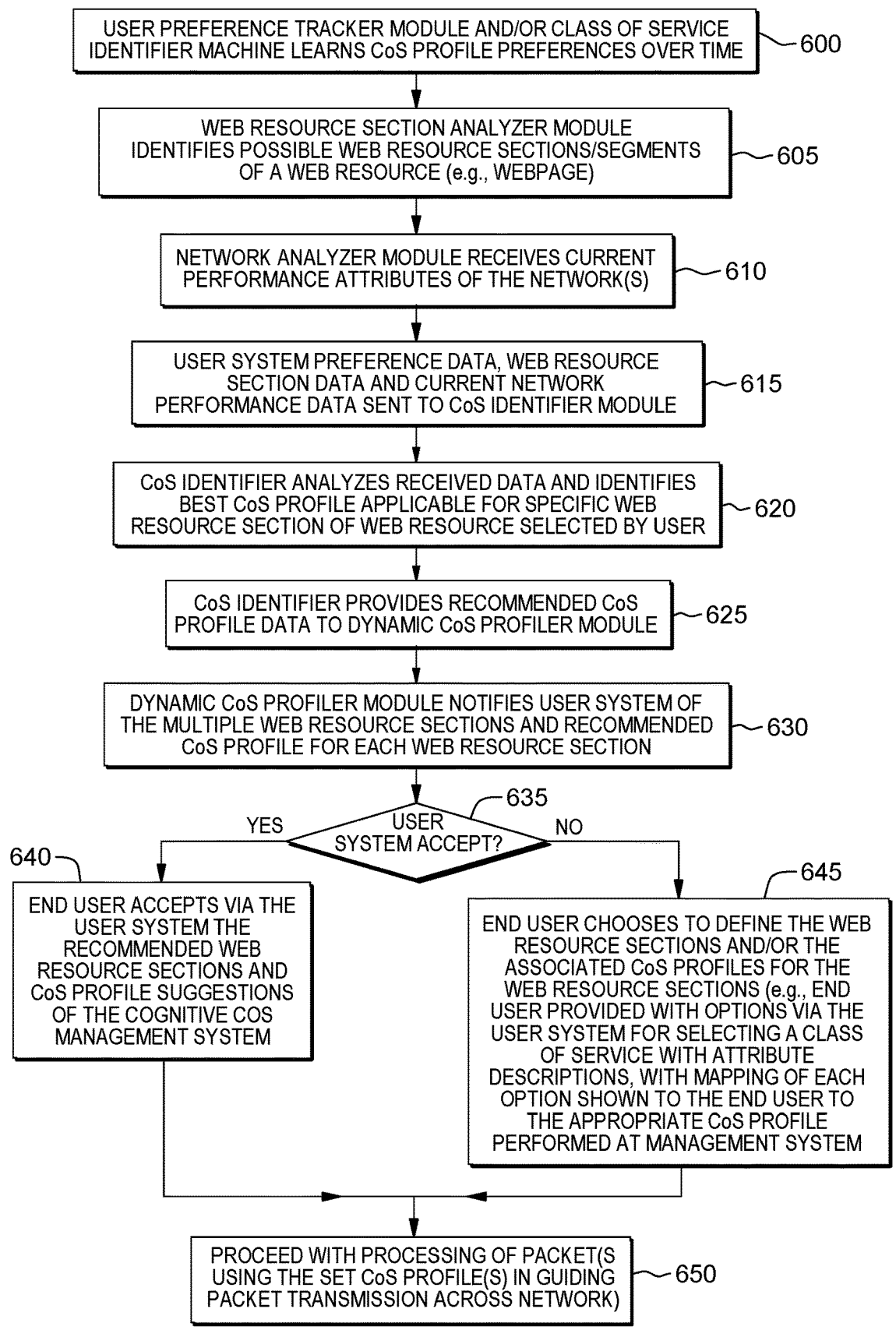
FIG. 6 depicts a further workflow illustrating, with reference to the embodiment of FIGS. 5A & 5B, certain aspects of some embodiments of the present invention.

Referring to the workflow embodiment of FIG. 6, along with the system embodiment of FIGS. 5A-5B, the user preference tracker module and/or the class of service identifier module machine learn (in one or more embodiments) class of service profile preferences for the user over time 600. For instance, in an initialization or learning stage, the program code can train one or more models based on patterns and available prior web resource access data, as well as any current web resource access data, such as data from user system preference tracker module 511 and web resource section(s) analyzer module 512. As part of this, machine learning agent 514 can construct one or more models, relational data structures or rules that map, for instance, one or more prior user web resource accesses, including prior applied class of service profiles and prior sectioning of web resources, to likely preferences of the user in connection with the current web resource access, and based on this, to compute one or more web resource sections and one or more CoS profile recommendations for the current web resource access.

In one or more embodiments, a machine learning training system can be utilized to perform cognitive analysis of various inputs, including various data inputs such as described herein, as well as any body of application-specific knowledge. The training data utilized to train the model in embodiments of the present invention can include a variety of types of data, as described. The program code in embodiments of the present invention can perform a cognitive analysis to generate data structures, including algorithms utilized by the program code to provide, for instance, a prediction on a CoS profile recommendation and/or a web resource sectionalizing recommendation. Machine learning (ML) solves problems that cannot be solved by numerical means alone. In a ML-based example, program code extracts various features/attributes from training data (e.g., data collected from prior web resource accesses, as well as network performance data) which can be stored in one or more places, including within the CoS management system. The features are utilized to develop a predictor function, also referred to as a hypothesis, which the program code utilizes to train the machine learning model.

In predicting a recommendation for web resource sections and associated CoS profile recommendations, the prior user web resource accesses can be evaluated. The program code can utilize various techniques to select features (elements, patterns, attributes, etc.) including, but not limited to, diffusion mapping, principal component analysis, recursive feature elimination (a brute force approach to selecting features), and/or a Random Forest, to predict recommended sections or segments of a webpage resource, and to provide associated CoS profile recommendations for each section. The program code can utilize a machine learning algorithm to train the machine learning model (the algorithms utilized by the program code), including providing rankings or weights for extracted data for inclusion, so that the program code can train the predictor or recommendation functions to include in the machine learning model. The conclusions can be evaluated by a quality metric. By selecting an appropriate set of training data, the program code trains the machine learning model to identify and weight various attributes (e.g., features, patterns) that correlate (for example) prior user web resource accesses to recommendations for web resource sectioning and/or recommendations for CoS profiles for the different sections.

The model can be self-learning, as the program code updates the model based on feedback received during web resource processing, particularly at the learning phase. For example, when program code determines that the user system has identified the web resource sections in a manner which differ from prior-identified web resource sections and/or, the end user has assigned different CoS profiles to the web resource sections than previously assigned, the CoS management system can update the model to reflect the change in order to improve future predictions. In certain embodiments, program code includes or utilizes the learning model, which cognitively analyzes any new data deviating from the model, and adjusts the model to improve the model moving forward.

In some embodiments of the present invention, program code executing on one or more computing resources utilizes existing cognitive analysis tools or agents to create, and tune, the model, based, for instance, on data obtained from the various data sources. Some embodiments of the present invention can utilize IBM Watson® as learning agent (i.e., as a cognitive agent). IBM Watson® is a registered trademark of International Business Machines Corporation, Armonk, N.Y., USA. In embodiments of the present invention, program code interfaces with IBM Watson® application programming interfaces (APIs) to perform cognitive analysis of obtained data. In some embodiments of the present invention, program code interfaces with the application programming interfaces (APIs) that are part of a known cognitive agent, such as the IBM Watson® application program interface (API), a product of International Business Machines Corporation, to determine impacts of data on the model and to update the model, accordingly.

In some embodiments of the present invention, certain of the APIs of the IBM Watson® API include a cognitive agent (e.g., learning agent) that includes one or more programs, including, but not limited to, natural language classifiers, Retrieve and Rank (i.e., a service available through the IBM Watson® developer cloud that can surface the most relevant information from a collection of documents), concepts/visualization insights, tradeoff analytics, document conversion, natural language processing, and/or relationship extraction. In an embodiment of the present invention, one or more programs can be provided to analyze data obtained by the program code across various sources utilizing one or more of a natural language classifier, Retrieve and Rank APIs, and tradeoff analytics APIs. In operation, the program code can provide predictions or recommendations based on one or more current and/or prior web resource accesses.

In some embodiments of the present invention, the management system program code can utilize a neural network to analyze collected data relative to one or more users to generate a model, for use in predicting web resource sections for a current user web resource access, and/or one or more CoS profile recommendations for one or more web resource sections of the web resource. Neural networks are a programming paradigm which enable a computer to learn from observational data. This learning is referred to as deep learning, which is a set of techniques for learning in neural networks. Neural networks, including modular neural networks, are capable of pattern (e.g., state) recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in multi-source processing, which the program code, in embodiments of the present invention, can accomplish when obtaining data and building a model for providing processing such as described herein.

Continuing with the workflow example of FIG. 6, and the system example of FIGS. 5A-5B, the web resource section(s) analyzer module 512 includes program code configured or programmed to identify or obtain recommended web resource sections or segments of the web resource 605. As noted, in one or more embodiments, the user system can be provided with the ability for the end user to sectionalize the web resource by selecting specific portions of the web resource which would, for instance, act as a short webpage, and also allow the user to assign a desired CoS profile for the selected web resource section, such as, for instance, via a CoS profile options menu, such as described above. Thus, in one or more embodiments, user system preference tracker module 511 facilitates learning the end user's CoS profile preferences over time, and the web resource section(s) analyzer module 512 facilitates identifying various possible sections or segments for a web resource for the particular user.

Network analyzer module 517 includes program code configured or programmed to receive or obtain current performance attributes of the network(s) 610. Together, data from user system preference tracker module 511, web resource section(s) analyzer module 512, and network analyzer module 517 is sent or provided to the CoS identifier module 615. The CoS identifier module analyzes the received data and identifies a recommended (for instance, best) CoS profile applicable for a specific web resource section of the web resource selected by the user 620. The CoS identifier module provides the recommended CoS profiler data to the dynamic CoS profiler module 625, and the dynamic CoS profile module notifies the user system of the suggested multiple web resource sections and the recommended CoS profiles for the web resource sections 630.

In the embodiment depicted in FIG. 6, the user is provided with the option whether to accept or reject the CoS management system recommendations 635. Where acceptable, the end user system accepts the web resource sections recommended and the CoS profile suggestions of the cognitive CoS management system 640, and proceeds with processing of the packets using the set CoS profile(s) to guide packet transmission across the network 650. Alternatively, the end user can choose to redefine the web resource sections and/or associated CoS profile recommendations for the web resource 645. For instance, the end user can be provided with options via the user system for selecting a class of service with attribute descriptions, and the system can map each option shown to the end user to the appropriate CoS profile performed at the management system 645, after which, processing of the packet proceeds using the set CoS profile(s) to guide packet transmission across the network 650.

Those skilled in the art will note from the description provided herein that a dynamic CoS management system and processing is disclosed which can utilize, in one or more embodiments, existing webpage sectionalizing methodologies to enable a user to select one or more specific portions of a webpage, which can logically act as a short webpage, and allow the user to assign desired CoS profiles to different web resource sections, such as different webpage sections. In general, the user is provided through the management system with an ability to define multiple web resource sections, such as different sections or segments of a webpage or application, and to assign different CoS profiles to each user-defined section of the web resource.

In one or more other embodiments, the CoS management system can include a user system preference tracker module, web resource section(s) analyzer module, network analyzer module, and/or dynamic CoS profiler module that, along with a class of service identifier module, learns one or more user preferences over time, and automatically detects various web resource sections or segments and performs an optimum CoS profile analysis for each web resource section. In one or more embodiments, based on the analysis performed by the CoS identifier module, the CoS profiler module can notify the user of the suggested web resource sections, and the recommended CoS profile for each section. The user can then either accept the web resource sections and/or CoS profile suggestions provided by the CoS management system, or the user can chose to redefine the web resource sections and/or CoS profiles.

In another embodiment, the cognitive CoS management system can be implemented in association with or at the web resource system (e.g., web server) to allow the system to learn CoS preferences of end users, and for each section of a web resource, to identify, for instance, web resource sections which the majority of users would prefer to receive, for instance, a high class of service, and to identify web resource sections for which the majority of users would prefer to receive a lower class of service. Based on this analysis, the web resource system can set and support the CoS profiles preferred by particular users for specific web resource sections, such as specific sections of a web page, which can then (in one or more embodiments) also be changed by the end user if the end user prefers to alter the CoS profile assigned to a particular section.

Advantageously, data-analysis-based class of service management for different webpage resource sections, as described herein, can be used in place of (for instance) a user opening multiple windows to complete a transaction during peak time. Rather, using the concepts disclosed herein, the user can designate a portion of a web resource, such as a portion of a webpage, to be of high importance, so that the network ensures that the selected web resource section is delivered on priority, without the user depending on opening multiple windows to complete a transaction. Further, the concepts disclosed herein ensure that the user is instructed and enabled to dynamically define various levels of CoS profiles for various sections of a web resource, for instance, based on the importance of the content of those sections in real-time for the current web resource access.

Figure 7A:
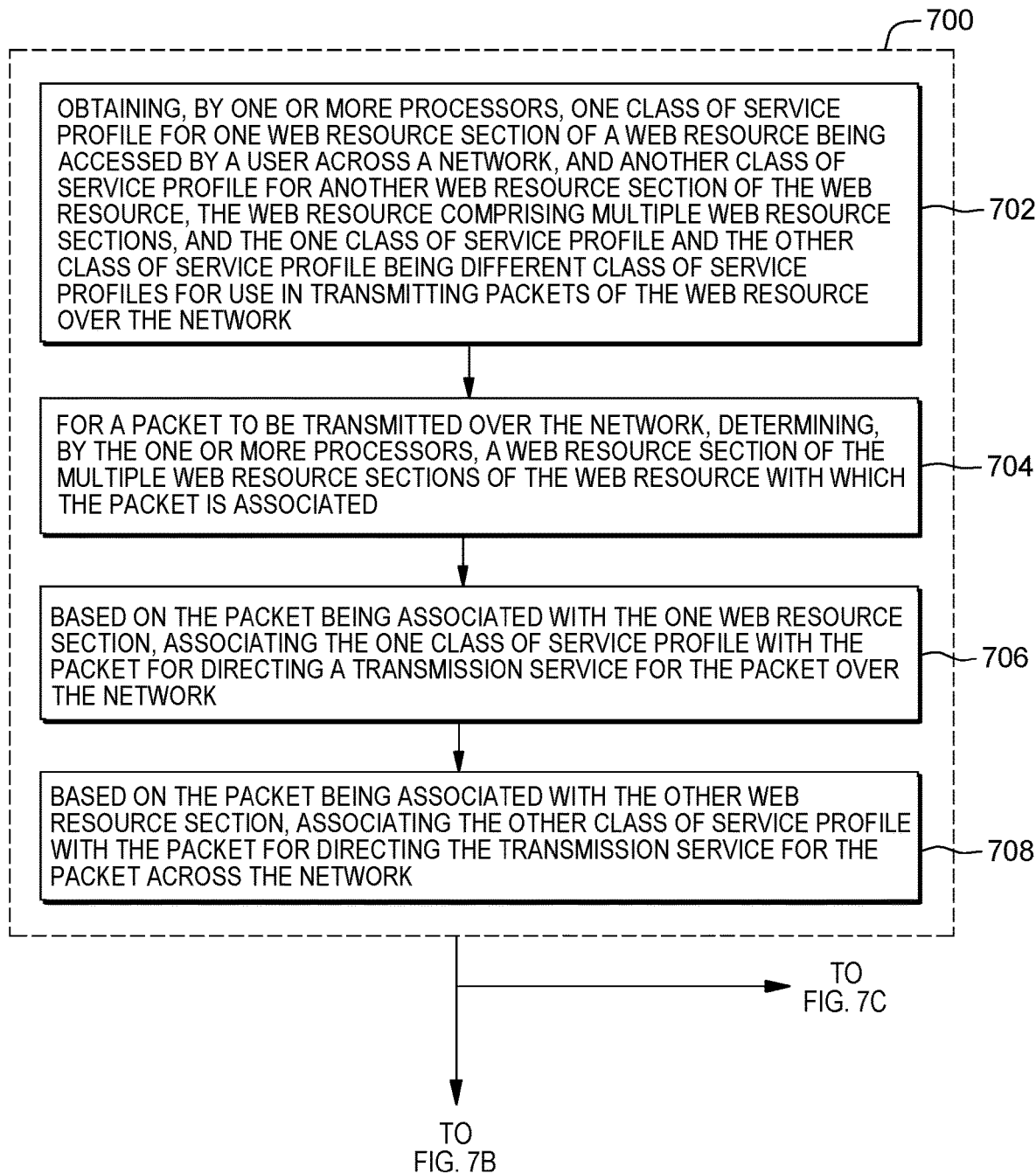
FIGS. 7A-7C depict a further workflow illustrating certain aspects of one or more embodiments of the present invention.
Figure 7B:
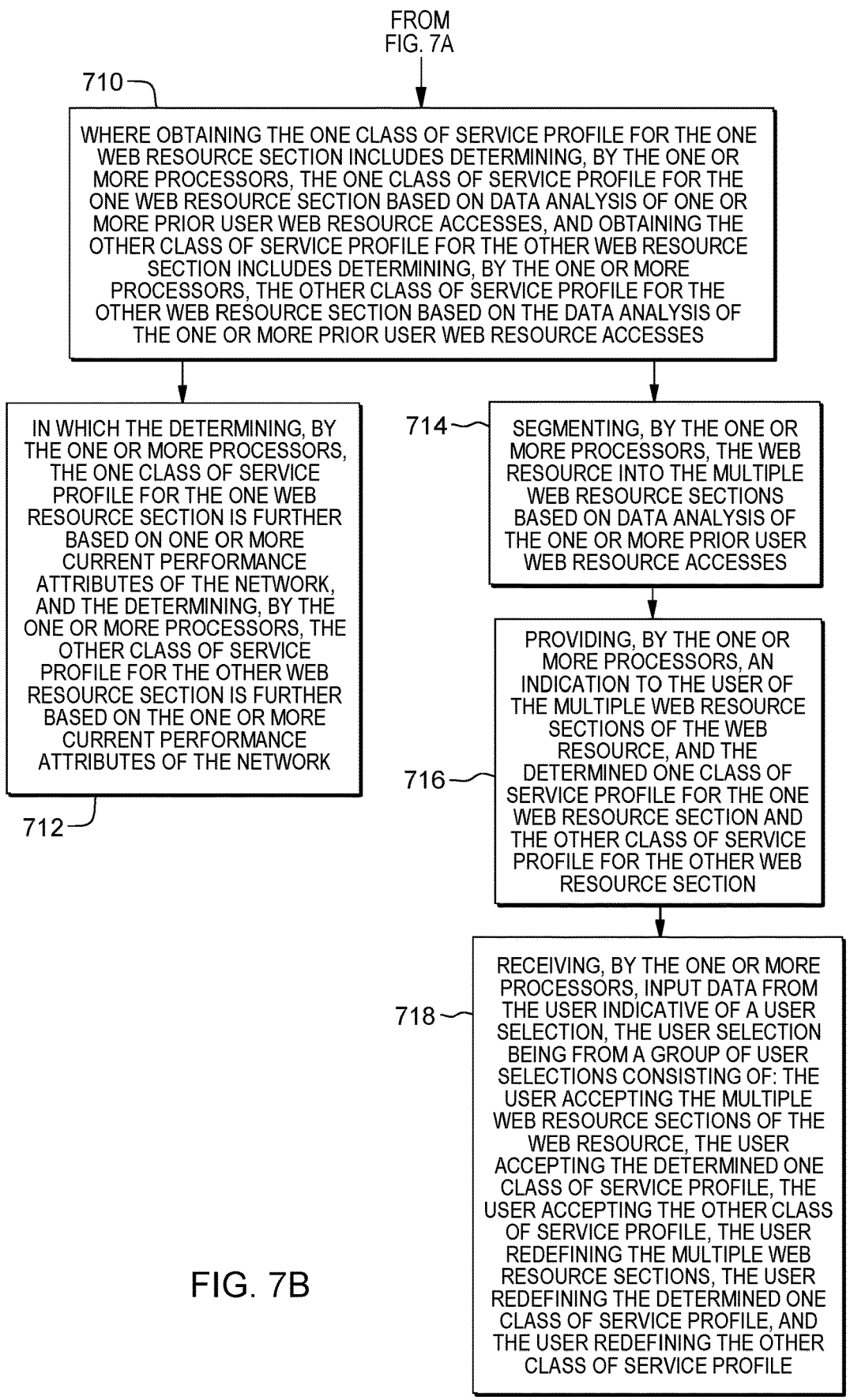
Figure 7C:
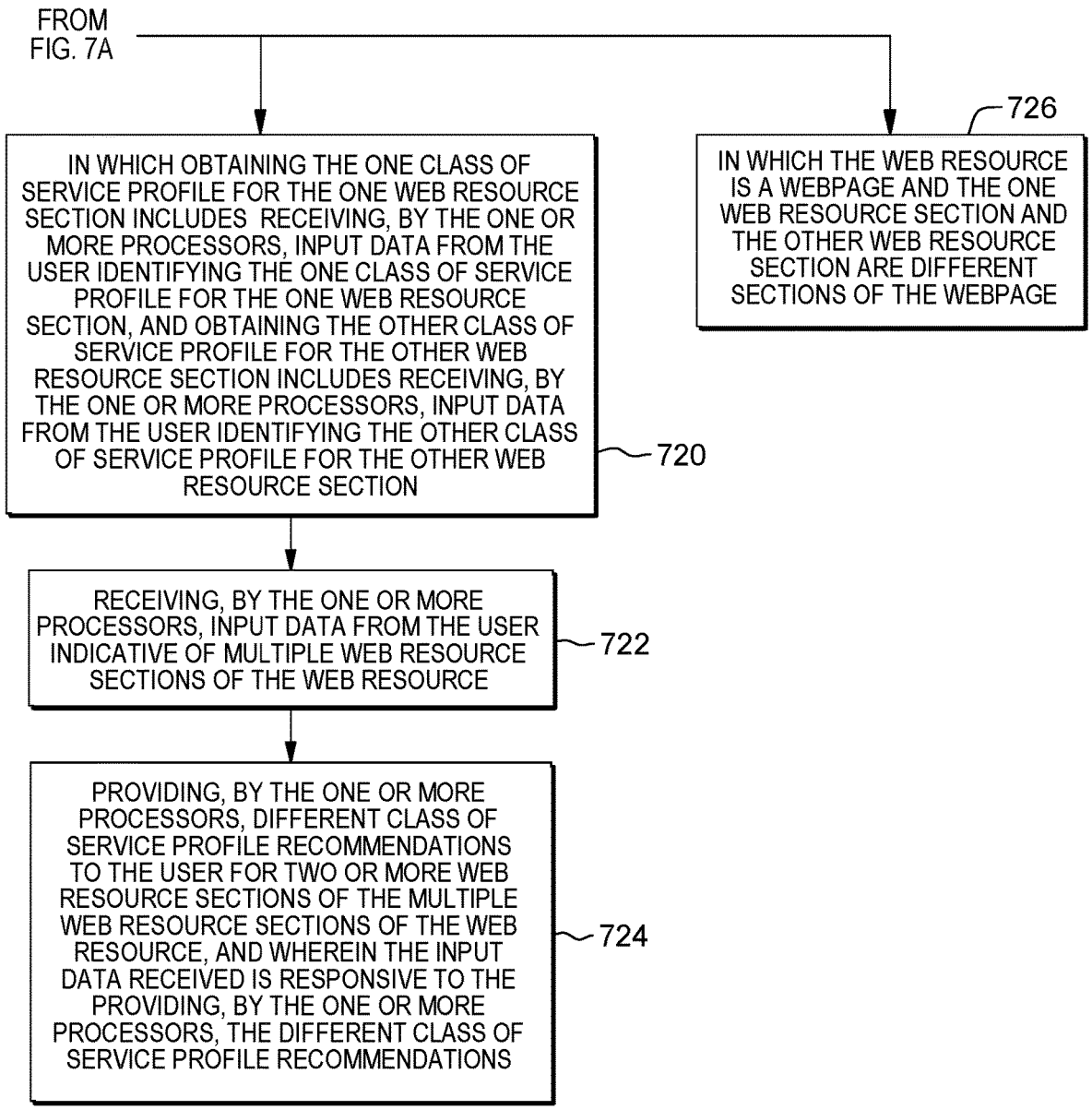

FIGS. 7A-7C depict a further embodiment of program code processing, in accordance with one or more aspects of the present invention.

Referring collectively to FIGS. 7A-7C, program code executing on one or more processors implements a process 700 which includes obtaining, by one or more processors, one class of service profile for one web resource section of a web resource being accessed by a user across a network, and another class of service profile for another web resource section of the web resource, where the web resource includes multiple web resource sections, and the one class of service profile and the other class of service profile are different class of service profiles for use in transmitting packets of the web resource over the network 702, and for a packet to be transmitted over the network, determining by the one or more processors, a web resource section of the multiple web resource sections of the web resource with which the packet is associated 704. Based on the packet being associated with the one web resource section, the process includes associating the one class of service profile with the packet for directing a transmission service for the packet over the network 706, and based on the packet being associated with the other web resource section, the process includes associating the other class of service profile with a packet for directing the transmission service for the packet across the network 708.

In one or more embodiments, obtaining the one class of service profile for the one web resource section includes determining, by the one or more processors, the one class of service profile for the one web resource section based on data analysis of one or more prior user web resource accesses, and obtaining the class of service profile for the other web resource section includes determining, by the one or more processors, the other class of service profile for the other web resource section based on the data analysis of the one or more prior user web resource accesses 710.

In one or more embodiments, the determining, by the one or more processors, the one class of service profile for the one web resource section is further based on one or more current performance attributes of the network, and the determining, by the one or more processors, the other class of service profile for the other web resource section is further based on the one or more current performance attributes of the network 712.

In one or more embodiments, the process further includes segmenting, by the one or more processors, the web resource into the multiple web resource sections based on data analysis of the one or more prior user web resource accesses 714. In one or more implementations, the process includes providing, by the one or more processors, an indication to the user of the multiple web resource sections of the web resource, and the determined one class of service profile for the one web resource section, and the other class of service profile for the other web resource section 716.

In one embodiment, the process includes receiving, by the one or more processors, input data from the user indicative of a user selection, where the user selection is from a group of user selections consisting of: the user accepting the multiple web resource sections of the web resource, the user accepting the determined one class of service profile, the user accepting the other class of service profile, the user redefining the multiple web resource sections, the user redefining the determined one class of service profile, and the user redefining the other class of service profile 718.

In one or more embodiments, obtaining the one class of service profile for the one web resource section includes receiving, by the one or more processors, input data from the user identifying the one class of service profile for the one web resource section, and obtaining the other class of service profile for the other web resource section includes receiving, by the one or more processors, input data from the user identifying the other class of service profile for the other web resource section 720. In one embodiment, the process further includes receiving, by the one or more processors, input data from the user indicative of multiple web resource sections of the web resource 722. Further, in one or more embodiments, the process includes providing, by the one or more processors, different class of service profile recommendations for the user for two or more web resource sections of the multiple web resource sections of the web resource, and wherein the input data received is responsive to the providing, by the one or more processors, the different class of service profile recommendations 724.

In one embodiment, the web resource is a webpage, and the one web resource section and the other web resource section are different sections of the webpage 726.

Further exemplary embodiments of a computing environment to implement one or more aspects of the present invention are described below with reference to FIGS. 8-9.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node can include a computer system/server, such as the one depicted in FIG. 2. Computer system/server 202 of FIG. 2 can be practiced in distributed cloud computing environments where tasks are performed by remote processing devices that are linked through a communications network. In a distributed cloud computing environment, program modules may be located in both local and remote computer system storage media including memory storage devices. Computer system/server 202 is capable of being implemented and/or performing any of the functionality set forth hereinabove.

Figure 8:
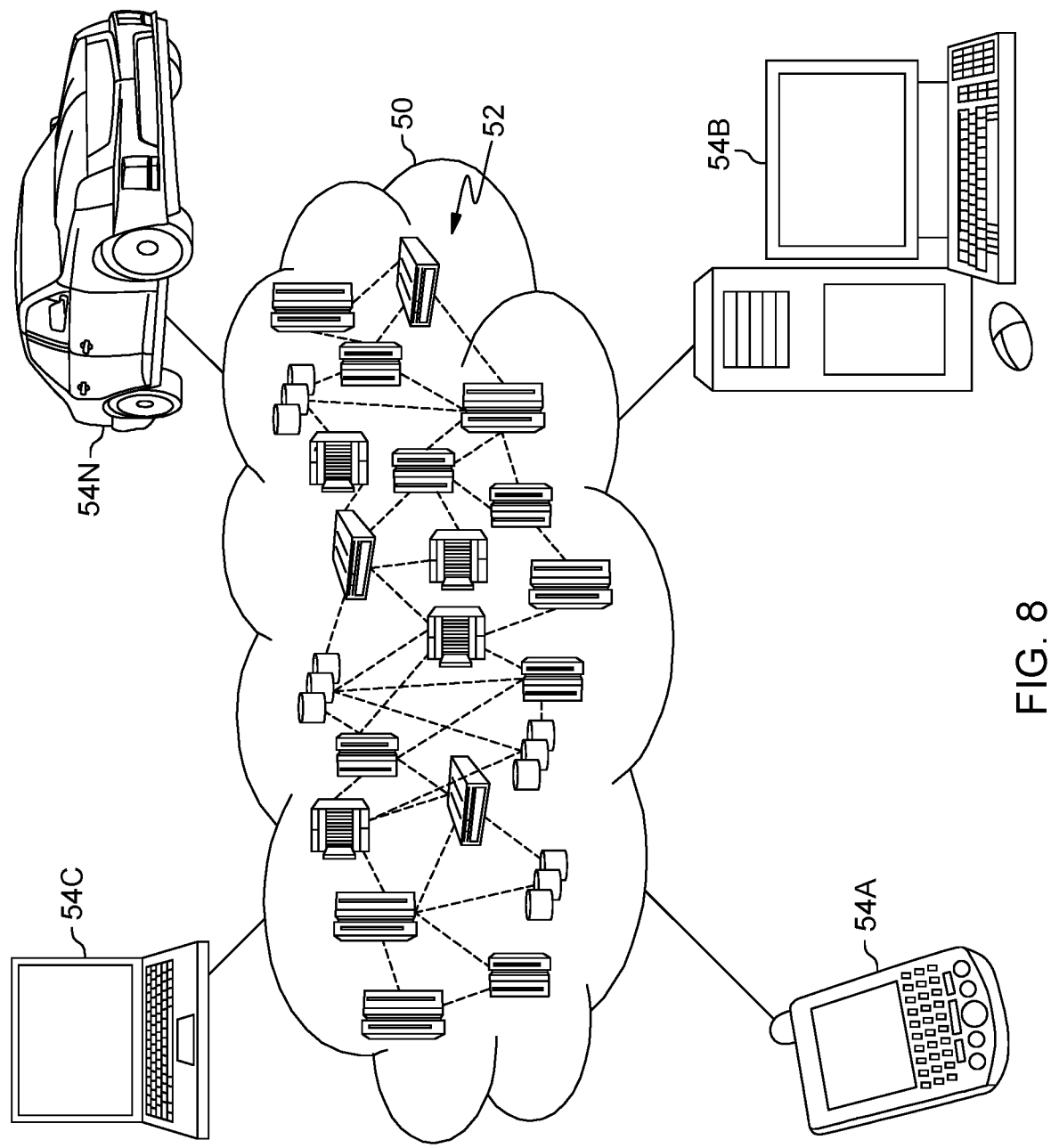
FIG. 8 depicts an embodiment of a cloud computing environment which can facilitate implementing, or be used in association with, certain aspects of an embodiment of the present invention.

Referring now to FIG. 8, illustrative cloud computing environment 50 is depicted. As shown, cloud computing environment 50 can comprise one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
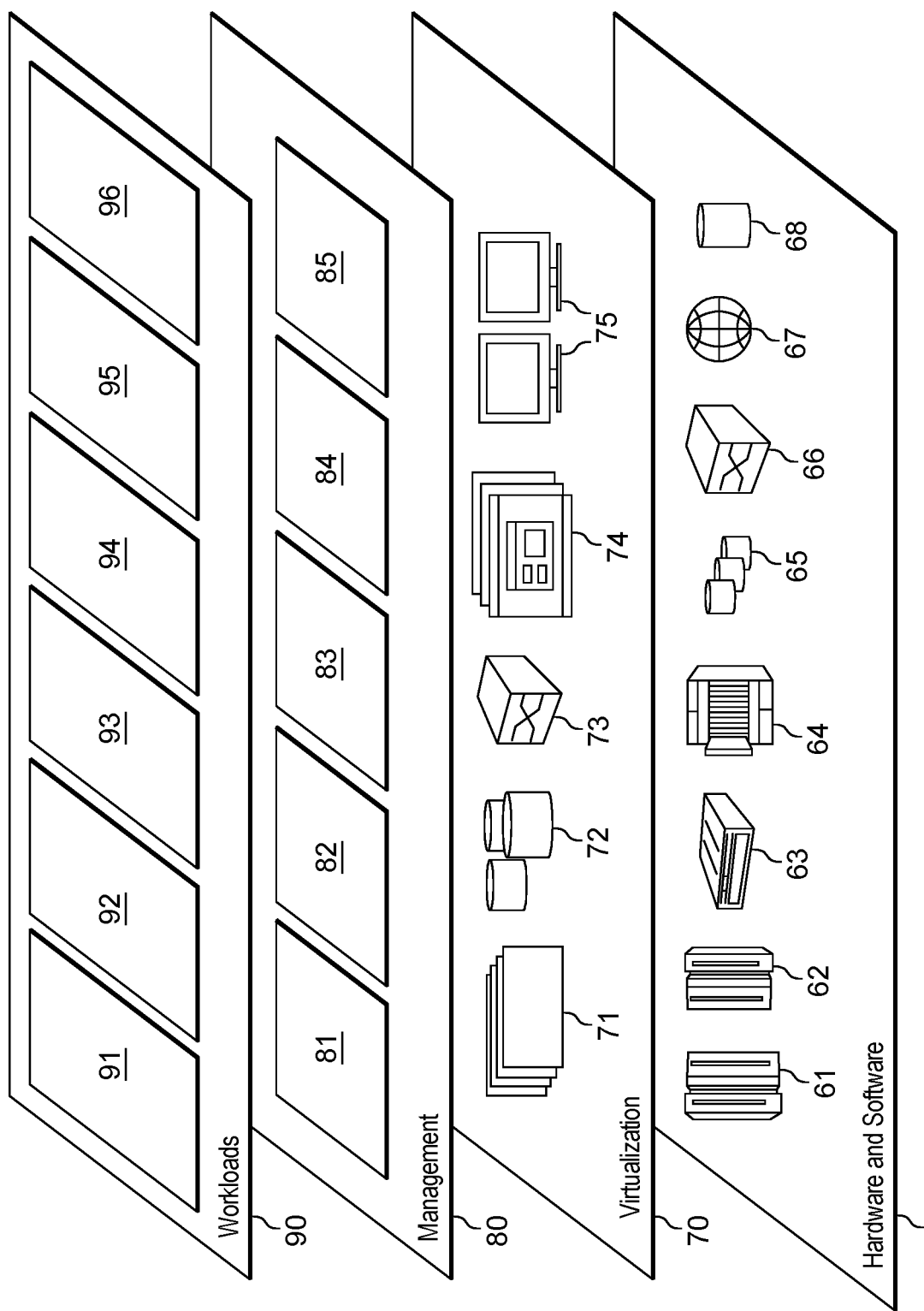
FIG. 9 depicts abstraction model layers according to an embodiment of the present invention.

Referring to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and class of service management processing for different web resource sections 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method of managing class of service profiles for use in packet transmission, the computer-implemented method comprising:
    obtaining, by one or more processors, one class of service profile for one web resource section of a web resource of a web resource provider system being accessed by a user across a network of a network server provider system, and another class of service profile for another web resource section of the web resource, the web resource comprising multiple web resource sections, and the one class of service profile and the other class of service profile being two different class of service profiles of multiple different predefined class of service profiles selectable for use by the network server provider system in transmitting packets of the web resource over the network, the one class of service profile and the other class of service profile being obtained based, at least in part, on prior user-related data obtained by the network server provider system;
    for a packet to be transmitted over the network, determining, by the one or more processors, a web resource section of the multiple web resource sections of the web resource with which the packet is associated;
    based on the packet being associated with the one web resource section, associating the one class of service profile with the packet for directing a transmission service for the packet over the network; and
    based on the packet being associated with the other web resource section, associating the other class of service profile with the packet for directing the transmission service for the packet across the network.

2. The computer-implemented method of claim 1, wherein obtaining the one class of service profile for the one web resource section comprises determining, by the one or more processors, the one class of service profile for the one web resource section based on data analysis of one or more prior user web resource accesses, and obtaining the other class of service profile for the other web resource section comprises determining, by the one or more processors, the other class of service profile for the other web resource section based on the data analysis of the one or more prior user web resource accesses.

3. The computer-implemented method of claim 2, wherein the determining, by the one or more processors, the one class of service profile for the one web resource section is further based on one or more current performance attributes of the network, and the determining, by the one or more processors, the other class of service profile for the other web resource section is further based on the one or more current performance attributes of the network.

4. The computer-implemented method of claim 2, further comprising segmenting, by the one or more processors, the web resource into the multiple web resource sections based on data analysis of the one or more prior user web resource accesses.

5. The computer-implemented method of claim 4, further comprising providing, by the one or more processors, an indication to the user of the multiple web resource sections of the web resource, and the determined one class of service profile for the one web resource section and the other class of service profile for the other web resource section.

6. The computer-implemented method of claim 5, further comprising receiving, by the one or more processors, input data from the user indicative of a user selection, the user selection being from a group of user selections consisting of: the user accepting the multiple web resource sections of the web resource, the user accepting the determined one class of service profile, the user accepting the other class of service profile, the user redefining the multiple web resource sections, the user redefining the determined one class of service profile, and the user redefining the other class of service profile.

7. The computer-implemented method of claim 1, wherein obtaining the one class of service profile for the one web resource section comprises receiving, by the one or more processors, input data from the user identifying the one class of service profile for the one web resource section, and obtaining the other class of service profile for the other web resource section comprises receiving, by the one or more processors, input data from the user identifying the other class of service profile for the other web resource section.

8. The computer-implemented method of claim 7, further comprising receiving, by the one or more processors, input data from the user indicative of multiple web resource sections of the web resource.

9. The computer-implemented method of claim 7, further comprising providing, by the one or more processors, different class of service profile recommendations to the user for two or more web resource sections of the multiple web resource sections of the web resource, and wherein the input data received is responsive to the providing, by the one or more processors, the different class of service profile recommendations.

10. The computer-implemented method of claim 1, wherein the web resource is a webpage and the one web resource section and the other web resource section are different sections of the webpage.

11. A system of managing class of service profiles for use in packet transmission, the system comprising:
a memory;
one or more processors in communication with the memory; and
program instructions executable by the one or more processors via the memory to perform a method comprising:
obtaining, by one or more processors, one class of service profile for one web resource section of a web resource of a web resource provider system being accessed by a user across a network of a network server provider system, and another class of service profile for another web resource section of the web resource, the web resource comprising multiple web resource sections, and the one class of service profile and the other class of service profile being two different class of service profiles of multiple different predefined class of service profiles selectable for use by the network server provider system in transmitting packets of the web resource over the network, the one class of service profile and the other class of service profile being obtained based, at least in part, on prior user-related data obtained by the network server provider system;
for a packet to be transmitted over the network, determining, by the one or more processors, a web resource section of the multiple web resource sections of the web resource with which the packet is associated;
based on the packet being associated with the one web resource section, associating the one class of service profile with the packet for directing a transmission service for the packet over the network; and
based on the packet being associated with the other web resource section, associating the other class of service profile with the packet for directing the transmission service for the packet across the network.

12. The system of claim 11, wherein obtaining the one class of service profile for the one web resource section comprises determining, by the one or more processors, the one class of service profile for the one web resource section based on data analysis of one or more prior user web resource accesses, and obtaining the other class of service profile for the other web resource section comprises determining, by the one or more processors, the other class of service profile for the other web resource section based on the data analysis of the one or more prior user web resource accesses.

13. The system of claim 12, wherein the determining, by the one or more processors, the one class of service profile for the one web resource section is further based on one or more current performance attributes of the network, and the determining, by the one or more processors, the other class of service profile for the other web resource section is further based on the one or more current performance attributes of the network.

14. The system of claim 12, wherein the program instructions executable by the one or more processors via the memory further perform segmenting, by the one or more processors, the web resource into the multiple web resource sections based on data analysis of the one or more prior user web resource accesses.

15. The system of claim 14, wherein the program instructions executable by the one or more processors via the memory further perform providing, by the one or more processors, an indication to the user of the multiple web resource sections of the web resource, and the determined one class of service profile for the one web resource section and the other class of service profile for the other web resource section.

16. The system of claim 15, wherein the program instructions executable by the one or more processors via the memory further perform receiving, by the one or more processors, input data from the user indicative of a user selection, the user selection being from a group of user selections consisting of: the user accepting the multiple web resource sections of the web resource, the user accepting the determined one class of service profile, the user accepting the other class of service profile, the user redefining the multiple web resource sections, the user redefining the determined one class of service profile, and the user redefining the other class of service profile.

17. The system of claim 11, wherein obtaining the one class of service profile for the one web resource section comprises receiving, by the one or more processors, input data from the user identifying the one class of service profile for the one web resource section, and obtaining the other class of service profile for the other web resource section comprises receiving, by the one or more processors, input data from the user identifying the other class of service profile for the other web resource section.

18. A computer program product comprising:
a computer-readable storage medium having program instructions embodied therewith, the program instructions being executable by one or more processors to cause the one or more processors to:
obtain, by one or more processors, one class of service profile for one web resource section of a web resource of a web resource provider system being accessed by a user across a network of a network server provider system, and another class of service profile for another web resource section of the web resource, the web resource comprising multiple web resource sections, and the one class of service profile and the other class of service profile being two different class of service profiles of multiple different predefined class of service profiles selectable for use by the network server provider system in transmitting packets of the web resource over the network, the one class of service profile and the other class of service profile being obtained based, at least in part, on prior user-related data obtained by the network server provider system;
for a packet to be transmitted over the network, determine, by the one or more processors, a web resource section of the multiple web resource sections of the web resource with which the packet is associated;
based on the packet being associated with the one web resource section, associate the one class of service profile with the packet for directing a transmission service for the packet over the network; and
based on the packet being associated with the other web resource section, associate the other class of service profile with the packet for directing the transmission service for the packet across the network.

19. The computer program product of claim 18, wherein obtaining the one class of service profile for the one web resource section comprises determining, by the one or more processors, the one class of service profile for the one web resource section based on data analysis of one or more prior user web resource accesses, and obtaining the other class of service profile for the other web resource section comprises determining, by the one or more processors, the other class of service profile for the other web resource section based on the data analysis of the one or more prior user web resource accesses.

20. The computer program product of claim 19, wherein the determining, by the one or more processors, the one class of service profile for the one web resource section is further based on one or more current performance attributes of the network, and the determining, by the one or more processors, the other class of service profile for the other web resource section is further based on the one or more current performance attributes of the network.

\* \* \* \* \*